June 10, 1952     R. BAJULAZ     2,599,969
BALL BEARING

Filed March 7, 1951     2 SHEETS—SHEET 1

Inventor:
Roger Bajulaz
by: J Delattre-Seguy
Attorney

Inventor:
Roger Bajulaz
by: J. Delattre-Seguy
Attorney

Patented June 10, 1952

2,599,969

UNITED STATES PATENT OFFICE 2,599,969

BALL BEARING

Roger Bajulaz, Geneva, Switzerland

Application March 7, 1951, Serial No. 214,260
In Switzerland March 9, 1950

6 Claims. (Cl. 308—6)

The present invention relates to a ball bearing; this ball bearing comprises two parallel rotatable cylinders between which a crown of balls is arranged, this crown being situated in a plane parallel to the axes of the cylinders and being able to rotate on itself. This ball bearing comprises moreover an armature guiding the balls and holding at least a part of them astride both cylinders.

The annexed drawing shows, by way of example, several embodiments of the invention.

Figure 1:
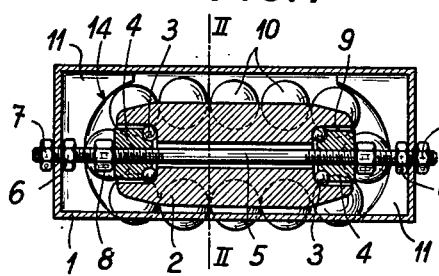
Fig. 1 is a sectional view, along line I—I of Fig. 2, of a first embodiment of a ball bearing box.
Figure 2:
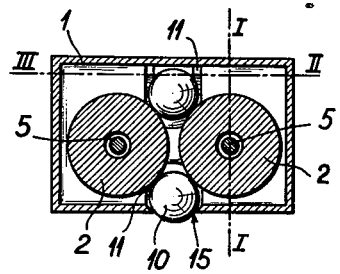
Fig. 2 is a sectional view along line II—II of Fig. 1.
Figure 3:
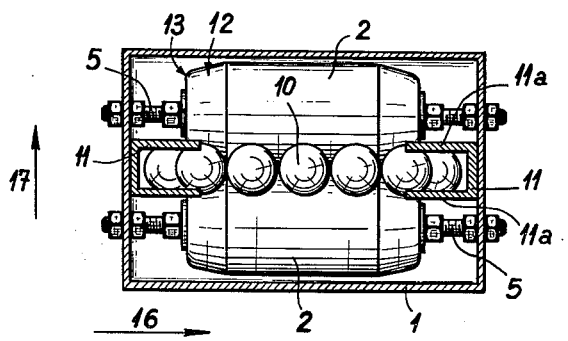
Fig. 3 is a sectional view along line III—III of Fig. 2.

The ball bearing box represented in Figs. 1 to 3 comprises a housing 1 enclosing two rotatable cylinders 2 arranged parallelly in the housing 1. These cylinders are mounted by means of balls 3 and members 4 on shafts 5 secured by their extremities in the walls of the housing 1. The shafts are secured to the housing by nuts 6 and 7 and the members 4 are pressed against the balls 3 by nuts 8. The balls 3 and the members 4 are disposed in recesses 9 provided at the ends of cylinders 2. A crown of balls 10 is situated in a plane parallel to the shafts of the cylinders and is disposed between the cylinders 2 each ball sitting astride both cylinders. These balls 10 are guided and held in place by an armature comprising two vertical columns 11 constituted by U-shaped members. The spacing of the flanges 11a of these members 11 is smaller than the diameter of the balls, so that these latter can roll on these flanges. The ends of the cylinders are conical at 12 and round at 13 and the edge of the flanges 11a is circular at 14, the whole for allowing the balls to turn along the cylinders. The lower face of the housing 1 is cut at 15 in such a way that the balls 10 appear outside the housing and can bear on the body.

These ball bearings are intended to carry loads which have to be displaced in two perpendicular directions, along the arrows 16 and 17 (Fig. 3), that is to say along directions parallel and perpendicular to the axes of the cylinders.

Figure 4:
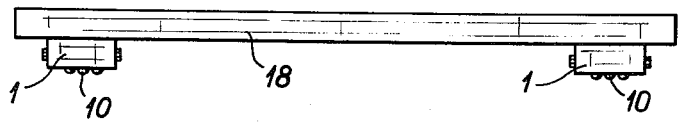
Fig. 4 is a side view of a truck carried by four ball bearing boxes.

Fig. 4 shows a truck 18 intended to carry, for instance, motor-cars. This truck is carried by four ball bearing boxes. During the displacements along directions 16, the crown of balls 10 turns around itself, while during the displacements along direction 17, the three balls 10 in contact with the body rotate on themselves and drive the cylinders 2.

Figure 5:
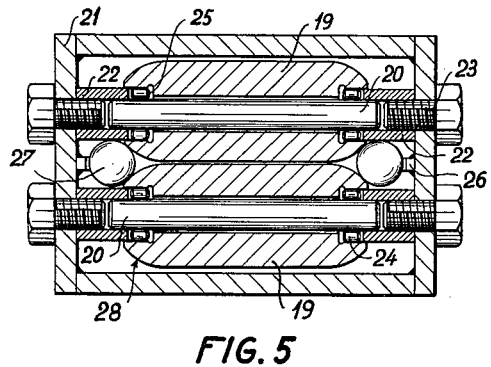
Fig. 5 is a sectional view, through the axes of the cylinders, of a modification of the first embodiment.

The modification of Fig. 5 differs from the first embodiment by the arrangement of the cylinders and by the guiding of the balls. Each cylinder designated by 19 is mounted on a shaft 20 constituted by the extension of a screw threaded in the casing 21 and carrying two sleeves 22 situated on both sides of the cylinder and limiting its longitudinal displacement. The sleeve 22 situated at the end of the shaft 20 is held in place by a screw 23 situated in alignment with the shaft 20. The cylinders rotate on rollers 24 located in recesses 25 of the cylinder and situated in alignment with the sleeves 22.

In the first embodiment, the balls 10 were guided by U-shaped vertical columns 11. In this modification, these columns 11 are replaced by plates 26 which, in side view, appear like the columns 11 of Fig. 1, but which are located at the centre of the balls 27. These latter are prevented from displacing laterally by the cylinders 19. It is to be noted that the ends of the cylinders are spherical at 28 and no more conical as in the first embodiment.

The ball bearing box shown in Fig. 5 operates like this one of Figs. 1 to 3.

Figure 6:
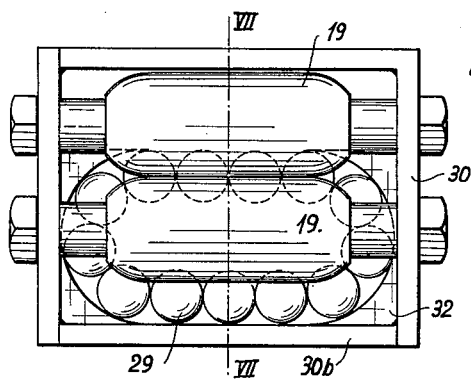
Fig. 6 is a view from above, the cover being taken away, of a second embodiment of a ball bearing box.
Figure 7:
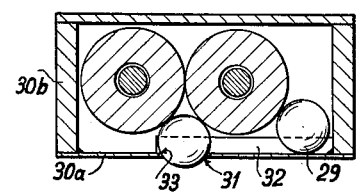
Fig. 7 is a sectional view along line VII—VII of Fig. 6.

The second embodiment (Figs. 6 and 7) is a ball bearing box the crown of balls 29 of which is no more situated in a vertical plane, as in the first embodiment but in a plane almost horizontal. The casing is designated by 30. It carries two cylinders mounted in the same way as in the modification of Fig. 5. The balls 29 pass astride both cylinders in a notch 31 provided in the bottom 30a of the housing; once at the end of this notch, they climb up this bottom 30a and roll on it for going around one of the cylinders 19 (the right in Fig. 7). They are guided in this running by the side wall 30b of the housing and by guiding members 32 which are semi-circular, and the face 33 of which, opposite the balls is concave. The balls are prevented to displace upwards by the cylinder with which they are in contact. This ball bearing box operates like this one of the first embodiment and is used for carrying loads which have to be displaced in two perpendicular directions.

Figure 8:
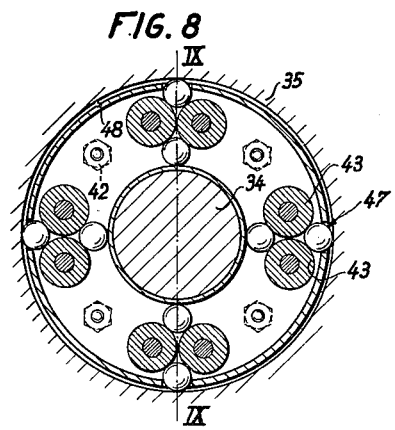
Fig. 8 is a sectional view, along line VIII—VIII of Fig. 9, of an example of application of the invention.
Figure 9:
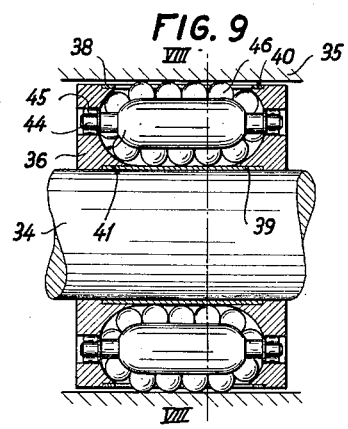
Fig. 9 is a sectional view along line IX—IX of Fig. 8.

Figs. 8 and 9 show another example of application of the invention applied to a ball bearing box for a shaft intended to be moved as well rotatably as longitudinally.

In this example, a single box comprises four ball bearings; the shaft is designated by 34 and the frame of the machine on which is mounted this ball bearing box, by 35. The casing comprises two circular flanges 36 provided with an annular groove 37, the right section of which is concave, and between which are disposed two cylindrical caps 38 and 39. These caps bear on seats 40, respectively 41, provided in the flanges 36. These flanges and the caps 38 and 39 are held together by screws 42 parallel to the shaft 34.

The box comprises four ball bearings disposed at 90° one from the other. Each ball bearing comprises two cylinders 43 rigidly mounted on shafts 44; these latter are rotatably mounted in the flanges 36 through rollers 45. Crowns of balls 46 surround these rollers in the same way as in the first embodiment (Figs. 1 to 3). These balls roll in the groove 37 of the flanges and on the cap 39. They pass in a notch 47 provided in the cap 38 and roll in the boring 48 of the frame 35. The shaft 34 is fitted in the cap 39. It can thus either rotate, driving the ball bearing box, the balls which are in contact with the frame rotating on themselves or be displaced longitudinally, driving likewise the ball bearing box, the balls rotating then around the cylinders.

Figure 10:
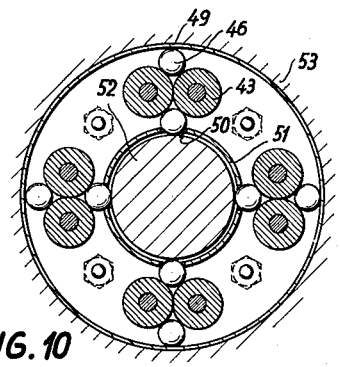
Fig. 10 is a sectional view similar to Fig. 8, of a modification of this example of application.

In the modification of Fig. 10, the balls 46 roll on the outer cap designated by 49 and pass through a notch 50 of the inner cap 51 for rolling on the shaft 52. The cap 49 is fitted in a boring of the frame 53. The ball bearing box is thus fixed, and the shaft only can turn and move itself longitudinally.

What I claim is:

1. In a ball bearing, a frame, two parallel cylinders rotatably mounted in said frame, a crown of balls situated in a plane parallel to the axes of the cylinders and able to turn around itself, at least a part of said balls sitting astride both cylinders, and an armature guiding these balls and holding them in place.

2. In a ball bearing, a frame, two parallel cylinders, the ends of which are spherical, rotatably mounted in said frame, a crown of balls all sitting astride both cylinders and surrounding these cylinders, said crown being able to turn around said cylinders, the distance between said cylinders being smaller than the diameter of the balls, and an armature guiding said balls.

3. In a ball bearing, a frame, two parallel cylinders, the ends of which are conical, rotatably mounted on said frame, a crown of balls all sitting astride both cylinders and surrounding these cylinders, said crown being able to turn around said cylinders, the distance between said cylinders being smaller than the diameter of the balls, and an armature guiding said balls.

4. In a ball bearing, a housing, two parallel cylinders, the ends of which are spherical, rotatably mounted in said housing, a crown of balls all sitting astride both cylinders and surrounding these cylinders, said crown being able to turn around said cylinders, the distance between said cylinders being smaller than the diameter of the balls, an armature guiding said balls, and a notch provided in the bottom of said housing and through which pass partly a part of said balls.

5. In a ball bearing, a housing, two parallel cylinders, the ends of which are conical, rotatably mounted in said housing, a crown of balls all sitting astride both cylinders and surrounding these cylinders, said crown being able to turn around said cylinders, the distance between said cylinders being smaller than the diameter of the balls, an armature guiding said balls and a notch provided in the bottom of said housing and through which pass partly a part of said balls.

6. In a ball bearing, a housing, two parallel cylinders rotatably mounted in said housing, a crown of balls situated in a plane parallel to the axes of the cylinders and able to turn around itself, a part of said balls sitting astride both cylinders, the distance between said cylinders being smaller than the diameter of the balls, an armature guiding said balls so that they roll on the bottom of the housing around one of said cylinders, and a notch provided in said bottom and through which pass partly these of said balls which sit astride both cylinders.

ROGER BAJULAZ.

REFERENCES CITED

The following references are of record in the file of this patent:

UNITED STATES PATENTS

| Number | Name | Date |
|---|---|---|
| 649,802 | Brewer | May 15, 1900 |